US011856191B2

(12) United States Patent
Ramchandran et al.

(10) Patent No.: US 11,856,191 B2
(45) Date of Patent: *Dec. 26, 2023

(54) METHOD AND SYSTEM FOR REAL-TIME CONTENT-ADAPTIVE TRANSCODING OF VIDEO CONTENT ON MOBILE DEVICES TO SAVE NETWORK BANDWIDTH DURING VIDEO SHARING

(71) Applicant: CRUNCH MEDIAWORKS, LLC, San Mateo, CA (US)

(72) Inventors: Amit K. Ramchandran, Foster City, CA (US); Aleksei Shevchenko, Santa Clara, CA (US); Karthik Raja Thangaraj, Fremont, CA (US)

(73) Assignee: CRUNCH MEDIAWORKS, LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/857,093

(22) Filed: Jul. 4, 2022

(65) Prior Publication Data

US 2022/0337827 A1 Oct. 20, 2022

Related U.S. Application Data

(63) Continuation of application No. 17/026,078, filed on Sep. 18, 2020, now Pat. No. 11,381,816, which is a
(Continued)

(51) Int. Cl.
*H04N 19/147* (2014.01)
*H04N 19/593* (2014.01)
(Continued)

(52) U.S. Cl.
CPC ......... *H04N 19/117* (2014.11); *H04N 19/132* (2014.11); *H04N 19/147* (2014.11);
(Continued)

(58) Field of Classification Search
CPC .. H04N 19/117; H04N 19/132; H04N 19/147; H04N 19/172; H04N 19/192;
(Continued)

(56) References Cited

U.S. PATENT DOCUMENTS 8,566,442 B2 10/2013 Jiang et al.
9,014,545 B2 4/2015 Park et al.
(Continued)

FOREIGN PATENT DOCUMENTS

| EP | 1631090 A1 | 3/2006 |
| KR | 10-0121164 B1 | 12/1997 |
| WO | 2012058394 A1 | 5/2012 |

OTHER PUBLICATIONS

EP Search Report and Opinion, EP Ser. No. 21.4155.12 pu, dated Feb. 15, 2022.
(Continued)

*Primary Examiner* — Susan E. Torgerson
(74) *Attorney, Agent, or Firm* — Carlos R. Villamar; The Villamar Firm PLLC

(57) ABSTRACT

A post processing system, method and computer program product content-adaptively transforms MPEG on-demand media streams, including a video optimizer software development kit (SDK); an application layer controlling the SDK interfacing with a mobile device operating and file system. Raw pixel frame buffers are parsed and structured. The buffers are normalizes for processing. Source content is analyzed in an uncompressed format for video patterns and characteristics and parameters are selected in a video codec output format. Estimated are parameters for portions and/or segments of the content. The content is recompressed and optimized in a content-adaptive manner to generate optimized content written into persistent storage of the mobile device, and segments of which are combined with an audio stream and/or a metadata stream information to generate a
(Continued)

playable media stream in an ISO base media file format and/or a media file application specific format.

18 Claims, 9 Drawing Sheets

Related U.S. Application Data continuation-in-part of application No. 16/290,554, filed on Mar. 1, 2019, now Pat. No. 10,785,481, which is a continuation of application No. 14/776,987, filed as application No. PCT/US2013/032303 on Mar. 15, 2013, now Pat. No. 10,230,951.

(51) Int. Cl.
| | | |
|---|---|---|
| *H04N 19/132* | (2014.01) | |
| *H04N 19/44* | (2014.01) | |
| *H04N 19/172* | (2014.01) | |
| *H04N 19/85* | (2014.01) | |
| *H04N 19/59* | (2014.01) | |
| *H04N 19/192* | (2014.01) | |
| *H04N 19/117* | (2014.01) | |

(52) U.S. Cl.
CPC ......... *H04N 19/172* (2014.11); *H04N 19/192* (2014.11); *H04N 19/44* (2014.11); *H04N 19/59* (2014.11); *H04N 19/593* (2014.11); *H04N 19/85* (2014.11)

(58) Field of Classification Search
CPC ...... H04N 19/44; H04N 19/59; H04N 19/593; H04N 19/85; H04N 19/115; H04N 19/14; H04N 19/177; H04N 19/40
USPC .......................................................... 375/240
See application file for complete search history.

(56) References Cited

U.S. PATENT DOCUMENTS

| | | |
|---|---|---|
| 9,521,354 B2 | 12/2016 | Park et al. |
| 2010/0080283 A1 | 4/2010 | Ali et al. |
| 2012/0026288 A1 | 2/2012 | Tourapis et al. |
| 2014/0208374 A1* | 7/2014 | Delaunay ......... H04N 21/23439 725/109 |
| 2014/0282766 A1* | 9/2014 | Good ................. H04N 21/2225 725/93 |

OTHER PUBLICATIONS

Extended European search report dated Jul. 27, 2016; Application No. 13878431.9; Applicant Icelero Inc.

PCT ISR and WO Ser. No. PCT US2013/032303 dated Dec. 13, 2013 (Dec. 13, 2013).

C.Andrew Segall et al., 'Pre- and Post-Processing Algorithms for Compressed Video Enhancement', Signals, Systems and Computers, 2000. Conference Record of the Thirty-Fourth Asilomar Conference on (vol. 2), Oct. 29, 2000-Nov. 1, 2000.

Inkyeom Kim et al., 'The Block-Based Preprocessing System for the Coding Performance Improvement', Consumer Electronics, 1998. ICCE. J 998 Digest of Technical Papers. International Conference on, Jun. 2-4, 1998.

\* cited by examiner

METHOD AND SYSTEM FOR REAL-TIME CONTENT-ADAPTIVE TRANSCODING OF VIDEO CONTENT ON MOBILE DEVICES TO SAVE NETWORK BANDWIDTH DURING VIDEO SHARING

CROSS REFERENCE TO RELATED DOCUMENTS

The present invention is a continuation of U.S. patent application Ser. No. 17/026,078 of Amit K. RAMCHANDRAN et al., entitled "METHOD AND SYSTEM FOR REAL-TIME CONTENT-ADAPTIVE TRANSCODING OF VIDEO CONTENT ON MOBILE DEVICES TO SAVE NETWORK BANDWIDTH DURING VIDEO SHARING," filed on 18 Sep. 2020, now allowed, which is a continuation in part of U.S. patent application Ser. No. 16/290,554 of Bjorn Steven HORI et al., entitled "METHOD AND SYSTEM FOR VIDEO CODEC RATE-DISTORTION PERFORMANCE BY PRE AND POST-PROCESSING," filed on 1 Mar. 2019, now U.S. Pat. No. 10,785,481, which is a continuation of U.S. patent application Ser. No. 14/776,987 of Bjorn Steven HORI et al., entitled "METHOD AND SYSTEM FOR VIDEO CODEC RATE-DISTORTION PERFORMANCE BY PRE AND POST-PROCESSING," filed on 15 Sep. 2015, now U.S. Pat. No. 10,230,951, which is a National Stage Entry of PCT Application Serial No. PCT/US2013/032303 of Bjorn Steven HORI et al., entitled "METHOD AND SYSTEM FOR IMPROVED VIDEO CODEC RATE-DISTORTION PERFORMANCE BY PRE AND POST-PROCESSING," filed on 15 Mar. 2013, now inactive, the entire disclosures of all of which are hereby incorporated by reference herein.

BACKGROUND OF THE INVENTION

Field of the Invention

The present invention generally relates to systems and methods for video compression (e.g., coding and decoding, multimedia streaming over wired and wireless data networks on mobile devices, and the like, more particularly to systems and methods for improved video compression performance using supplemental pre and post processing, streaming and real time editing of multimedia content within the context of Moving Picture Experts Group (MPEG)-ISO Base Media Delivery Format (MOV, MP4) on mobile devices, and the like.

Discussion of the Background

In recent years, systems and method for video coding and decoding using a video codec (COmpression-DECompression), and the like, have been developed and continually refined. However, such systems and methods for video coding and decoding, and the like, have been hindered by various limitations, for example, including limitations related to rate-distortion performance particularly at lower bit-rates, and the like. In addition, video content streaming or sharing over HTTP (HyperText Transfer Protocol) has become the dominant means of video delivery over the internet, and the like. However, Video payload delivery over HTTP has insurmountable limitations, particularly under challenging network conditions, such as resource constrained networks, mobile device operating system resource management guidelines and policies, maintaining seamless user experience on mobile devices, and the like.

SUMMARY OF THE INVENTION

Therefore, there is a need for methods and systems that address the above and other problems with systems and methods for video coding and decoding, and the like. Accordingly, the above and other needs are addressed by the illustrative embodiments of the present invention, which provide a novel method and system that introduces pre- and post-processing stages before and after a video codec (COmpression-DECompression), which can yield improved rate-distortion performance compared to direct use of the video codec alone (e.g., both for subjective and objective quality measures). In practice, the invention introduces a supplementary human-vision perceptual model (e.g., in addition to the model resident in the codec), which more tightly bounds the range of outputs from the video codec (e.g., holding all other variables constant). Advantageously, the invention is video codec agnostic, and can be successfully applied to numerous commercially available video codecs, and the like. There also is a need for methods and systems that address the above and other problems with systems and methods for multimedia content sharing and streaming on the mobile devices, and the like. Accordingly, the above and other needs are addressed by further aspects of the illustrative embodiments of the present invention, which provide a novel method and system that facilitates transcoding and editing of multimedia content in real-time on mobile devices shared with an on-demand Moving Picture Experts Group (MPEG)-ISO Base Media Delivery Format (MOV, MP4), and the like. The resultant transcoded content on mobile devices adheres to the MPEG-ISOBM standard, and does not alter the playability of the stream in any way, and the like. For example, the novel system, method and computer program product can include modifying on-demand multimedia content in real-time includes; video parsing stage parses video content on the fly to retrieve original video frames, preprocessing stage where the original content is normalized for video pattern or characteristics retained for suitability and compatibility, video analysis stage in which the content is analyzed for input signal characteristics like degree of motion, motion-blur, focus-blur, degree of complexity of objects in frames, and the like, Encoding Budget stage which estimates bitrates, frame rates, resolutions and the specified target video codec level encoding parameters for portions or segments of the video content in the incoming stream, Optimization stage which encodes each portions or segments of the content either simultaneously or sequentially with selected encoding and stream configurations for each portions or segments, reassemble stage is the last stage of the systems which assembles all the optimized portions or segments of the source content to a complete video in a fully compatible playable format stream which can be played on any mobile or portable multimedia device, and the like.

Accordingly, in an illustrative aspect, there is provided a post processing system, method and computer program product that content-adaptively transforms MPEG on-demand media streams, including a video optimizer software development kit (SDK); an application layer controlling the SDK interfacing with a mobile device operating and file system. Raw pixel frame buffers are parsed and structured. The buffers are normalizes for processing. Source content is analyzed in an uncompressed format for video patterns and characteristics and parameters are selected in a video codec output format. Estimated are parameters for portions and/or segments of the content. The content is recompressed and optimized in a content-adaptive manner to generate optimized content written into persistent storage of the mobile device, and segments of which are combined with an audio stream and/or a metadata stream information to generate a playable media stream in an ISO base media file format and/or a media file application specific format.

An applied selective content-adaptive transcoding method on the mobile device reduces a size of video segments in the source content to improve delivery efficiency over a communications network, and which includes video analysis method, including a method for analyzing portions and/or selective segments in the source content, a method for analyzing segments in the source content for selection of the set of encoding parameters based on video encoding capabilities and operating ranges of the video encoders as hardware and/or software available on the mobile device.

The video parsing stage parses video streams from the source content to an uncompressed pixel format into a random access memory of the mobile device, the preprocessing stage accesses raw video buffers and normalizes the raw video buffers for further processing, the video analysis stage analyzes the raw video buffers received from the preprocessing unit for video patterns and characteristics, including degree of motions, motion-blur, and/or focus-blur on video objects in the raw pixel frame buffers to calculate the optimized encoding parameters in the content-adaptive manner, the encoding budget stage receives the optimized encoding parameters selected by the video analysis module to calculate a final set of encoding parameters in a target video codec format selected and applied by configuration settings of the application layer, and the encoding budget stage estimates the final parameters for the portions and/or segments in the source content.

The optimization stage accesses a video encoder as hardware and/or software available on the underlying mobile device in a specified video codec output format to recompress each of the portions and/or segments in the source content, the optimization stage writes the recompressed video segments into the persistent storage of the mobile device, and the reassembly stage retrieves each of the reprocessed video segments stored in the persistent storage of the mobile device system and combines the reprocessed video segments with the audio stream and/or a metadata stream information to generate the playable media stream in the ISO base media file format and/or the media file application specific format.

A quick complexity inference method based on stream prior encoded information and characteristics deployed in the video analysis stage of the video optimizer SDK, including setting up a full system flow in the application layer, and configuring the video optimizer SDK for a transcode session on the mobile device. The video parsing stage parses video streams in the source content into uncompressed video frames on random access memory of the mobile device, and which are accessed by the preprocessing stage for normalizing for processing by the video analysis stage. The video analysis stage employs the quick complexity inference method for selecting the portions and/or segments in the source content for analysis by restructuring a complexity curve from stream prior information in the source content. The video analysis stage selects the set of encoding parameters for predetermined portions and/or segments in the source content and forwards to the selects the set of encoding parameters to an encoding budget stage. The encoding budget computes the final set of encoding parameters for the portions and/or segments in the source content by using the encoding parameters the video analysis stage estimated for the predetermined segments in the source content using the quick complexity inference method. The encoding budget stage estimates the final set of encoding parameters for each of the portions and/or segments available in the source content based on the video codec format specified during configuration of the video optimizer SDK.

The optimization stage accesses a video encoder as hardware and/or software available on the underlying mobile device in a specified video codec output format to recompress each of the portions and/or segments in the source content. The optimization stage writes the recompressed video segments into the persistent storage of the mobile device. The reassembly stage retrieves each of the reprocessed video segments stored in the persistent storage of the mobile device system and combines the reprocessed video segments with the audio stream and/or a metadata stream information to generate the playable media stream in the ISO base media file format and/or the media file application specific format.

Still other aspects, features, and advantages of the present invention are readily apparent from the following detailed description, simply by illustrating a number of illustrative embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings, in which like reference numerals refer to similar elements, and in which.

DETAILED DESCRIPTION OF THE PREFERRED EMBODIMENTS

Figure 1:
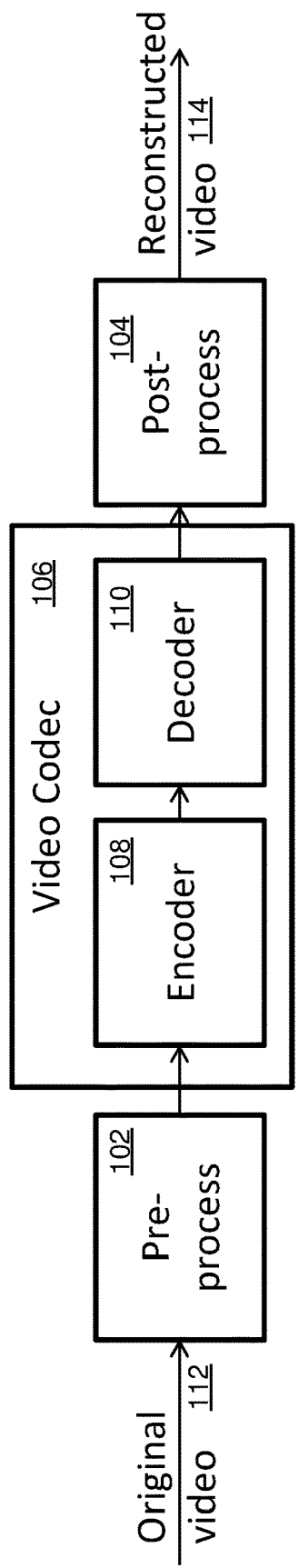
FIG. 1 is an illustrative system block diagram including pre- and post-processing blocks shown in context with a video codec and video input and output.

The present invention includes recognition that a video codec (COmpression-DECompression) algorithm can be used to reduce the amount of data employed to represent a given video sequence (e.g., "video") by one of two fundamental means, including "lossless" coding techniques and "lossy" coding techniques. Lossless coding techniques allow for perfect reconstruction of the video upon decompression, but provide very limited reductions in the data employed to represent the video. Lossy coding techniques intentionally introduce distortion making a tradeoff between fidelity (e.g., trueness to the original video according to some metric) and data requirements for representation.

Such a tradeoff is made according to human-vision perceptual models, which attempt to keep distortion below the threshold of perception. Compared to lossless coding techniques, lossy coding techniques can realize very large reductions in the data employed to represent the video. Lossy video codecs in common use today include MPEG-2 (e.g., broadcast digital TV, DVD) and H.264 (e.g., Blue ray Disc, Internet video streaming Adobe Flash Player, Microsoft Silverlight).

Video capture and delivery to network connected mobile devices, such as "smartphones" and "tablets," and the like, is an area of tremendous growth and interest recently. However, the wireless cellular data networks that connect these devices to the internet to retrieve, store, or share video content, are highly constrained compared to typical personal-computer internet connections (e.g., DSL, Cable, T1), which typically forces content providers targeting mobile devices to tune their video codecs to operate in a range where distortion is perceptible.

Compression performance (e.g., the amount the data representation is reduced) is often measured and quoted in bits-per-pixel after compression to represent the original video sequence at a given quality. Another, and equivalent, way of characterizing compression performance is bits-per-second employed for the compressed representations, but for this value to have significance one would have to also know the resolution (e.g., width and height) and frame-rate of the original video.

Quality is measured subjectively and objectively. Subjective quality measurements are generally the consensus opinion of a panel of critical viewers (e.g., commonly referred to as Mean-Opinion-Score or MOS). Objective quality measurements are analytical calculations that generally determine the level of "difference" or "similarity" between the original video sequence and the compressed version. Quality measures are often referred to as "distortion" measures as they characterize the differences, or distortions, the compression process has imparted on the video.

Modern video codecs, such as MPEG-2 and H.264 are very sophisticated systems, which for a given input can produce a range of possible outputs (e.g., various related data rates and qualities). The most fundamental parameters of operation of a video codec explore the tradeoffs between data rates (e.g., bits-per-pixel), video quality (or e.g., inversely, distortion), and algorithmic or computational complexity (e.g., the effort employed to achieve the compression result).

One typically cannot optimize all three of these fundamental parameters simultaneously. Accordingly, the following generalizations may apply (e.g., for a given video input): (1) Lower data rates are associated with lower quality; and (2) Higher complexity is associated with higher quality for a given data rate.

When a video codec is targeting lower data rates, distortion typically becomes visible. The type and nature of the visible distortion is controlled algorithmically by the codec, but when pushed to extremely high compression-performance (e.g., low bits-per-pixel or low bits-per-second), at a certain point, the codec has little choice but to produce widespread visible distortion in its output to satisfy the targeted data rate and level of computational complexity.

To address the above and other problems with systems and methods for video coding and decoding, and the like, generally, the illustrative method and system introduce pre- and post-processing stages before and after a video codec, which can yield improved rate-distortion performance compared to direct use of the video codec alone (e.g., both for subjective and objective quality measures).

Referring now to the drawings, in FIG. 1 there is shown an illustrative system block diagram 100 including pre- and post-processing blocks shown in context with a video codec and video input and output. In FIG. 1, the system 100 can include a pre-processing stage 102 before a coder 108 of a video codec 106, and a post-processing stage 104 after a decoder 110 of the video codec 106. The stages 102 and 108 can be configured as two-dimensional digital filters, and the like, that rescale a video sequence on a frame-by-frame basis, altering its spatial dimensions and introducing distortion related to the scaling operations.

For example, the pre-processing filter 102 downscales the width and height dimensions of the video frame from the original width and height to smaller dimensions, resulting in an alternative representation of the video frame that contains fewer pixels. Such alternative representation is input into the video codec 106 instead of the original video 112. With fewer pixels to encode, the video codec 106 can realize a lower level of distortion, relative to encoding the original video 112 at the same target data rate (e.g., with fewer pixels to encode the bits-per-pixel allocation goes up, reducing codec induced distortion). The post-processing filter 104 upscales the output from the video codec 106 as reconstructed video 114 back to the input videos original width and height dimensions.

Figure 2:
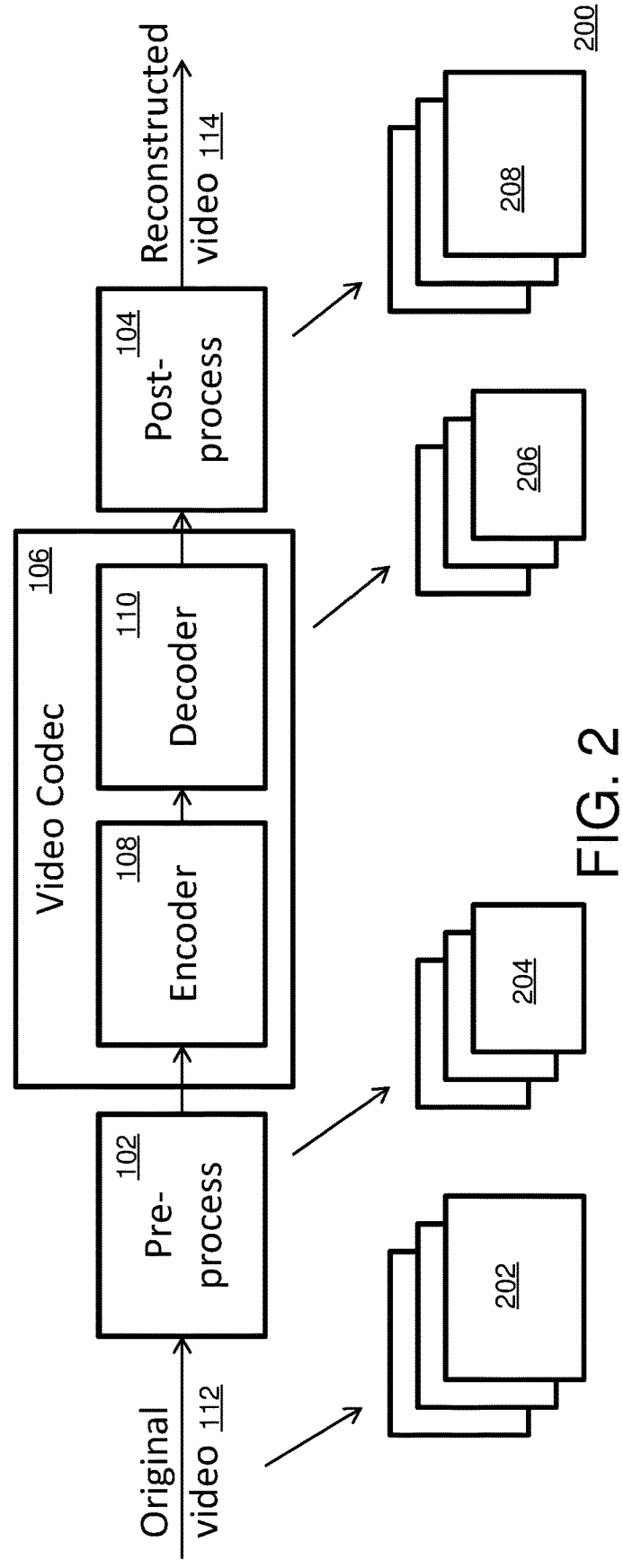
FIG. 2 expands the system block diagram of FIG. 1 to include representation of pre- and post-processing scaling filters.

FIG. 2 expands the system block diagram of FIG. 1 to include representation of pre- and post-processing scaling filters. In FIG. 2, the distortion introduced by the pre-processing filter 102 and the post-processing filter 104 is deterministic and concentrated in higher spatial frequencies where human contrast sensitivity is lowest, in contrast to video codec distortion, which at lower data rate targets becomes non-deterministic and generally distributed across the spatial frequency spectrum. Accordingly, frames 202 of the original video 112 are downscaled by the pre-processing filter 102, as frames 204, processed by the codec, as frames 206, upscaled by the post-processing filter 104, as frames 208, to generate the reconstructed video 114.

The magnitude and perceptibility of the inventions induced distortion is variable and determined by the combination of: (1) The degree to which the spatial dimensions are altered; (2) Complexity of the digital filters chosen to perform the alteration; (3) Characteristics of the original video sequence.

Figure 3:
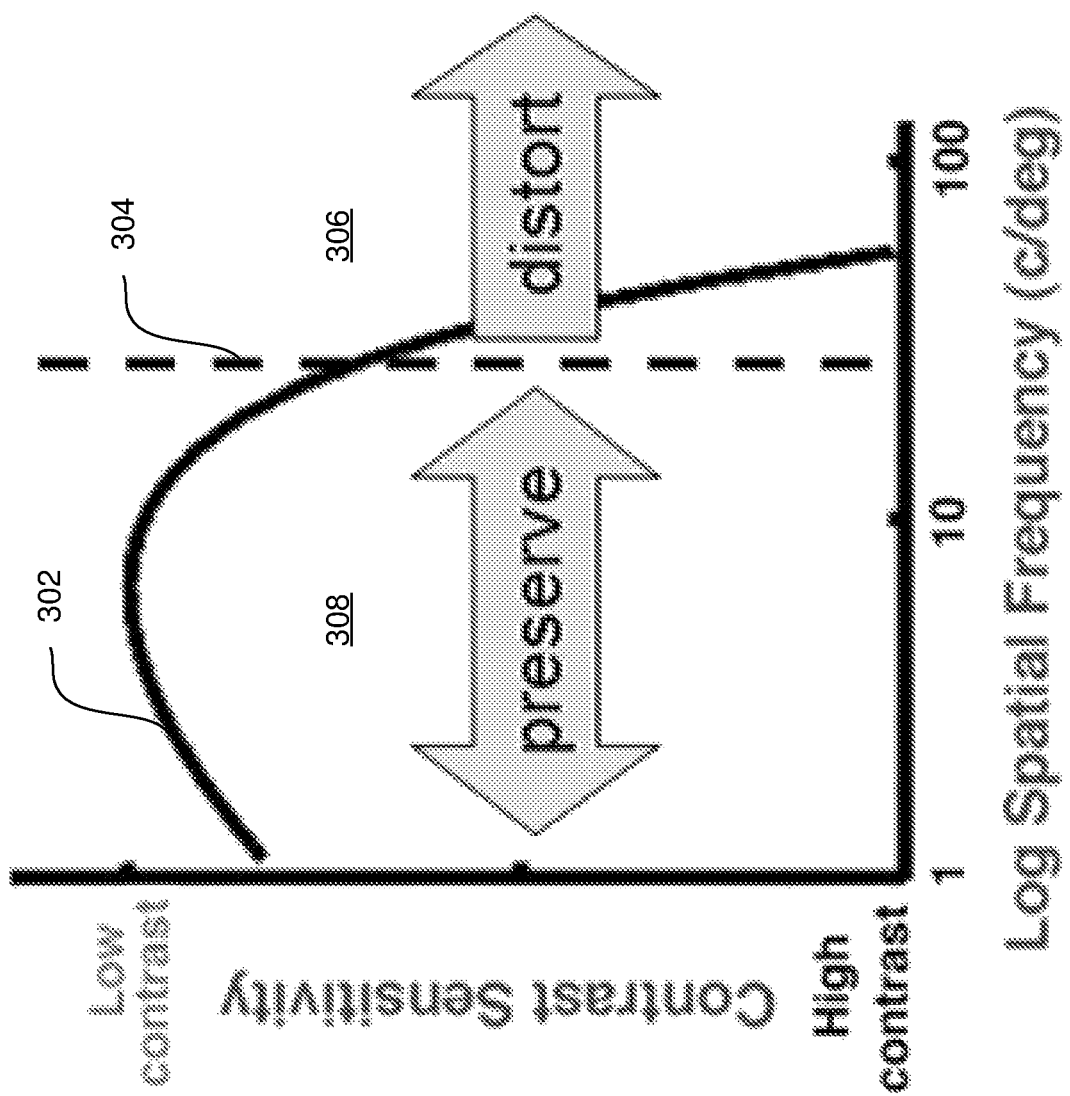
FIG. 3, shows an average human contrast-sensitivity function overlaid with digital filter cutoff frequency in one dimension (e.g., the invention actually applies digital filters in two dimensions)

FIG. 3 shows an average human contrast-sensitivity function 302 overlaid with digital filter cutoff frequency 304 of the digital filter 102 in one dimension (e.g., the invention actually applies digital filters in two dimensions). In FIG. 3, the digital filter 102 of the invention removes the higher spatial frequencies 306 to the right of the dashed filter cut-off frequency 304, while generally preserving the lower spatial frequencies 308 to the left of the dashed filter cut-off frequency. The selection of the filter cut-off frequency 304 is a function of the degree of resolution downscaling applied, wherein higher levels of downscaling correspond to moving the filter cut-off frequency towards the left, which in turn corresponds to greater invention induced distortion.

Invention induced distortion is not solely determined by the selection of filter cut-off frequency (e.g., cut-off frequency determines "band-limiting" artifacts), but also by the quality of the actual filter selected to perform the operations. Filter quality is typically proportional to computational complexity while the "aliasing" artifacts introduced by the filtering process are typically inversely proportional.

The following generalizations apply: (1) Lower levels of dimensional scaling are associated with lower levels of invention induced distortion; and (2) More complex digital filters are associated with lower levels of invention induced distortion. The total distortion imparted on a compressed video in the presence of the invention will be the sum of the invention induced distortion and the distortion imparted by the selected video codec 106 operating with a given set of parameters.

By varying the degree to which the spatial dimensions are altered and/or the complexity of the digital filters at run-time (e.g., collectively, the inventions run-time parameters), the invention allows the tradeoff between the pre-processing filter 102 and the post-processing filter 104 induced distortion, and video codec 106 induced distortion to be modulated at any desired granularity, from one video frame up to any arbitrary group of video frames, and the like. Optimal control over the invention's run-time parameters is based on the analysis of the characteristics of the original video 112, the desired output data-rate, and the rate-distortion performance of the selected video codec 106 without intervention by the invention.

For example, videos with fast motion, motion induced blur, focal blur, low contrast, low detail, or any suitable combination thereof, typically benefit from higher degrees of invention induced distortion. By contrast, videos with little or no motion, sharp focus, high contrast, high detail, or any suitable combination thereof, typically benefit from a lower degree of invention induced distortion.

Generally, as data rates for a given video are driven down (e.g., equivalently, as compression is increased), video codec induced distortion becomes more and more disturbing perceptually, and higher degrees of invention induced distortion become preferable to additional video codec induced distortion.

Figure 4:
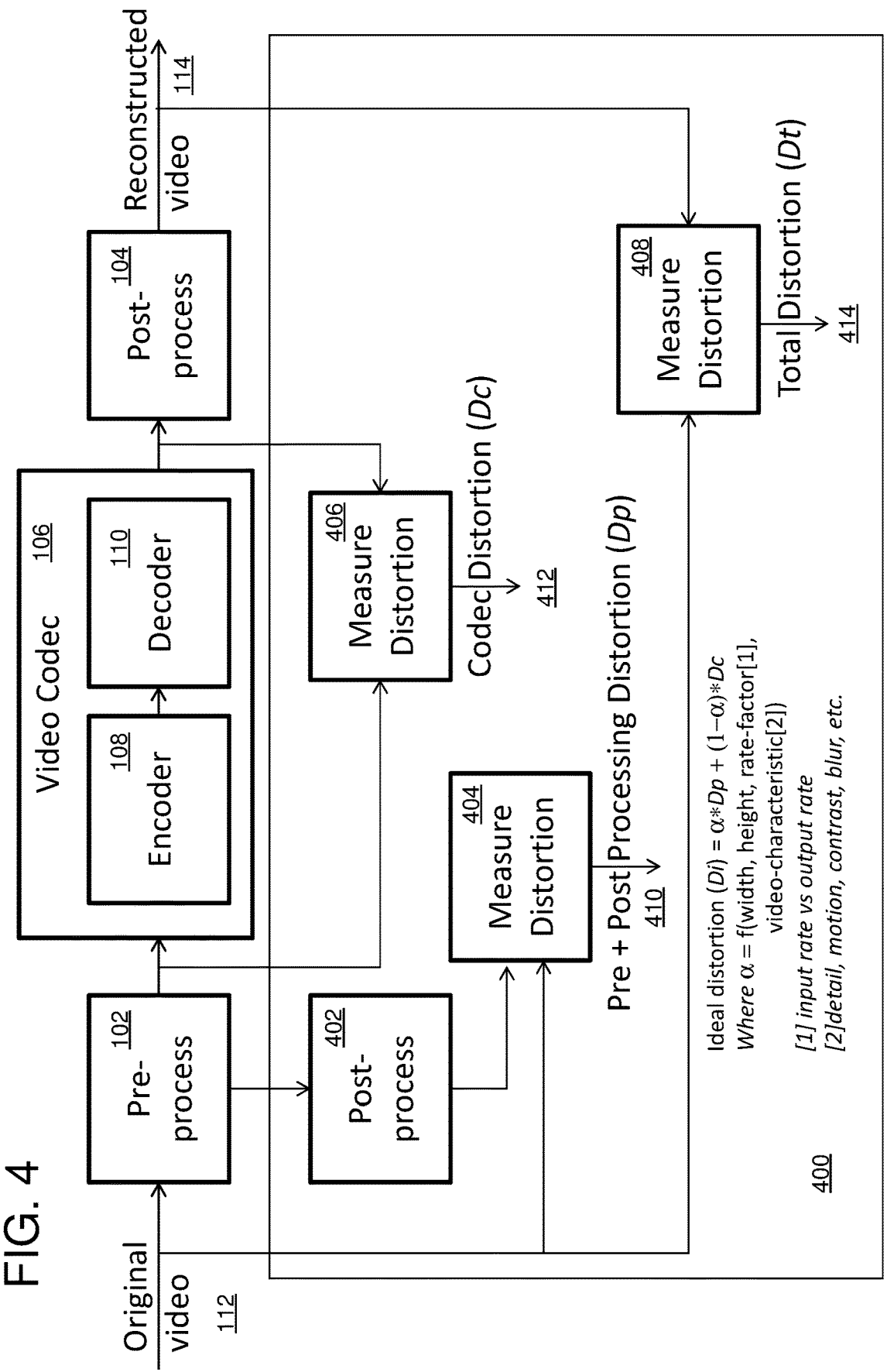
FIG. 4 shows a distortion measurement system that enables calculation of an ideal distortion trade-off and optimal run-time control.

FIG. 4 shows a distortion measurement system 400 that enables calculation of the ideal distortion trade-off, optimal run-time control, and the like. In FIG. 4, the following generalizations apply: (1) at very low data rate targets (e.g., equivalently, as compression is increased), invention induced distortion becomes preferable to additional video codec 106 induced distortion. The measurement system 400 can include a post processing stage 402, a distortion measuring stage 404 (e.g., to measure pre and post processing distortion 410), a distortion measuring stage 406 (e.g., to measure codec distortion 412), and a distortion measuring stage 408 (e.g., to measure total distortion 414).

Figure 5:
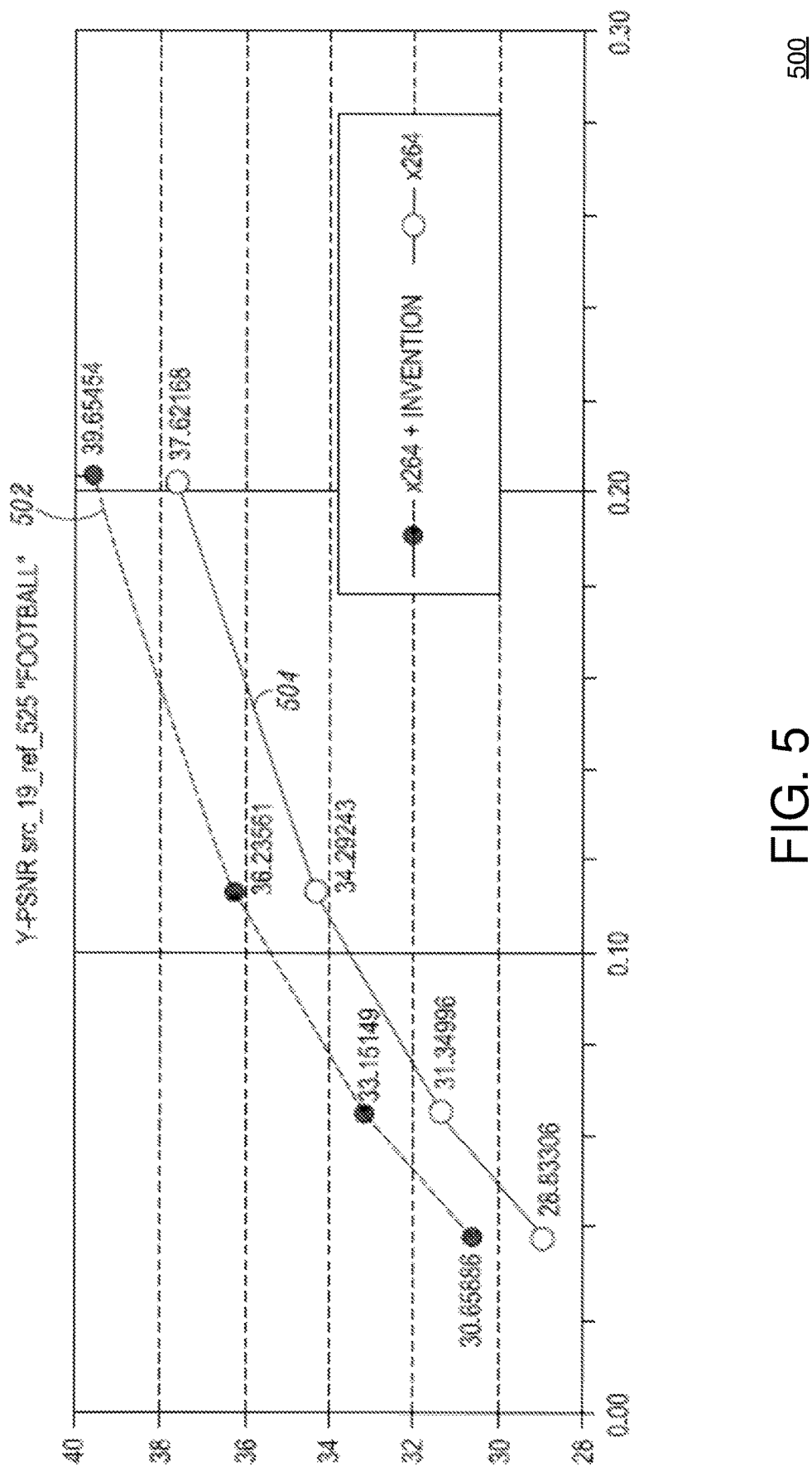
FIGS. 5 and 6 show the effectiveness of the invention when used in combination with the H.264 video codec protocol.
Figure 6:
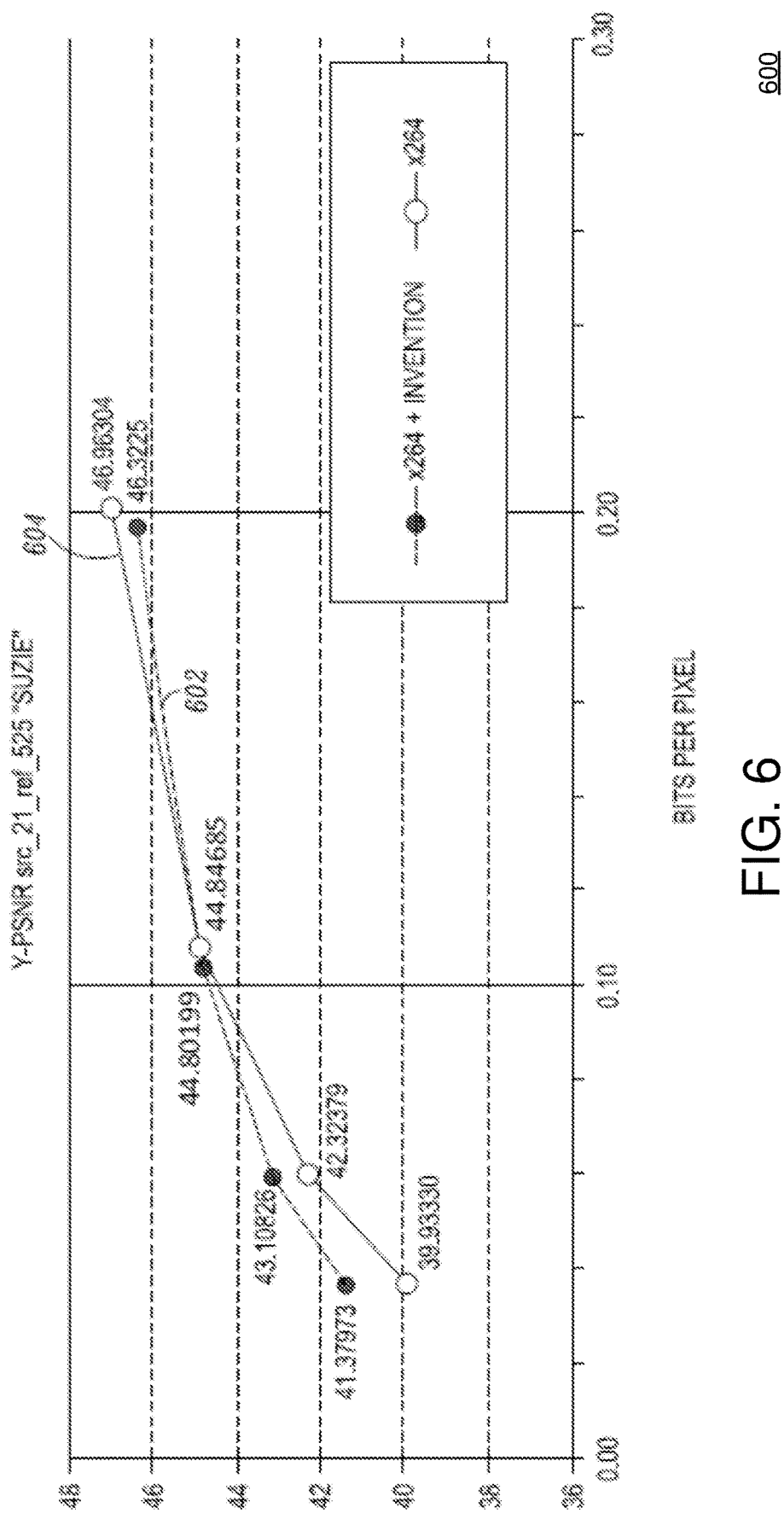

FIGS. 5 and 6 shows the effectiveness of the invention when used in combination with the H.264 video codec protocol. In FIG. 5, represented is a video with fast motion, motion induced blur, and focal blur. Under such conditions, invention induced distortion 502 provides benefits (e.g., as measured by YPSNR) across a wide range of target data-rates, as compared to H.264 protocol induced distortion 504.

In FIG. 6, on the other hand, represented is a video with little or no motion, sharp focus, and high contrast and detail. In this case, invention induced distortion 602 provides YPSNR based benefits at lower target data-rates, as compared to H.264 protocol induced distortion 604.

The following table provides a recipe for generating the results of FIGS. 5 and 6.

TABLE

| Recipe for generating FIG. 5 and FIG. 6 results | | | |
|---|---|---|---|
| Source video (VQEG) | src19_ref_525 src21_ref_525 | | |
| Preparation | Interlaced to progressive scan conversion using Yadif interpolation top field Center crop to 640 × 480 VGA | | |
| Pre-processing filter | Lanczos a = 3 Sinc-weighted-sinc | | |
| Downscale-factor | 2 | | |
| Video Codec | x264 (H.264) | | |
| Video Codec Parameters | Preset: Medium, Tuning: none, Profile: baseline, Level: auto, rate-control: singlepass ratefactor-based | | |
| Rate parameters (target bit-rates) | Source | Codec Alone | Invention |
| | src19_ref_525 | crf 25 | crf 16.1 |
| | | crf 30 | crf 21.5 |
| | | crf 35 | crf 26.3 |
| | | crf 40 | crf 30.5 |
| | src21_ref_525 | crf 17 | crf 11 |
| | | crf 21 | crf 15 |
| | | crf 25 | crf 18.6 |
| | | crf 29 | crf 21.7 |
| Post-processing filter | Lanczos a = 3 Sinc-weighted-sinc | | |
| Upscale-factor | 2 | | |

The results illustrated in FIGS. 5 and 6 can be reproduced, based on the above table, and the following steps, for example, as follows:

Step 1: Acquire and prepare the source video sequence ("Original Video"),

Step 2: Video codec alone:
(a) Encode the Original Video sequence at various different bit-rate (e.g., bits-per-pixel) targets with the prescribed video codec, producing one "Encoded Original Video Stream" per bit-rate target.
(b) Decode each Encoded Original Video Stream with the prescribed video codec (e.g., "Decoded Original Video").
(c) Perform YPSNR comparison between Original Video and Decoded Original Video.
(d) Graph YPSNR vs bits-per-pixel for each Encoded Original Video Stream.

Step 3: Video Codec plus invention:
(a) Apply prescribed pre-processing downscale filter with the prescribed scale-factor to produce the codec input video sequence (e.g., "Pre-processed Video").
(b) Encode the Pre-processed Video sequence at various different bit-rate (e.g., bits-per-pixel) targets with the prescribed video codec, producing one "Encoded Video Stream" per bit-rate target.

(c) Decode each Encoded Video Stream with the prescribed video codec (e.g., "Decoded Video").
(d) Apply prescribed post-processing upscale filter of prescribed scale-factor (e.g., "Reconstructed Video").
(e) Perform YPSNR comparison between Original Video and Reconstructed Video.
(f) Graph YPSNR vs bits-per-pixel for each of the Encoded Video Stream.

The present invention further includes recognition that, in recent years, video content streaming or sharing over HTTP (HyperText Transfer Protocol) has become the dominant means of video delivery over the internet, and the like. However, Video payload delivery over HTTP has insurmountable limitations, particularly under challenging network conditions, such as resource constrained networks, mobile device operating system resource management guidelines and policies, maintaining seamless user experience on mobile devices, and the like. During video sharing or streaming sessions on mobile devices when the video payload size is reasonably higher, then the mobile devices and resources are stressed to push the payload out to the network with higher energy by means of using higher battery consumption as well. Apart from that, the network delivery infrastructure exists today with all the latest advancements still facing bottlenecks of delivering such higher size video payload in congested network areas. The delivery infrastructure has to work harder to find an efficient path of delivering a higher size video payload from a sender's mobile device to a single or multiple receiving mobile client device, and the like.

Accordingly, in a further illustrative aspect, there is provided a system, method and computer program product for real-time post-processing system that transforms multimedia content on the mobile device to a reduced size multimedia content which makes the video sharing easier on mobile devices over wireless or wired networks which includes software development kit (SDK) comprising a video parsing unit meant to parse incoming video content to an uncompressed video pixel format, preprocessing unit to normalize uncompressed video to be suitable for analysis, video analysis unit to analyze the content characteristics in the original video, optimization unit to recompress incoming content with a more optimized parameters for the target stream configuration and reassemble unit to generate a final video from recompressed original content in the specified or designated stream configuration, and the like.

The applied selective transcoding on mobile devices to reduces the size of the media segment improves delivery efficiency over a communications network which includes wireless and wired networks and also delivery services like modern file delivery services and streaming services exists today for transmitting video payload from mobile device on one geographical location to an another device or devices located on a different geographical location. Minimizing the size of video payload on mobile devices at the same quality as original or in any acceptable quality range, which a particular service or an mobile application expecting to, alleviates greatly network congestion or preventing network to be constrained for situations when lot of users in a single geo-location, during an social event or community event, attempting to share video content in a momentary demand fashion. This also avoids broadcast or delivery networks to employ aggressive bandwidth constraint policies on certain zonal areas to overcome such congestions scenarios.

Application or services running on mobile devices makes a call to a video optimizer software development kit which retrieves multimedia content that are stored and available in the mobile device persistent storage system which in turn produces optimized content as an output which again is stored into the mobile device persistent storage. Operating system that runs on the mobile device manages the memory and the computational resources the software development kit needs to execute its functionality from time to time. The software units or modules built-in the software development kit, which performs real-time content-adaptive optimization of multimedia content for faster to transmit over networks, functions or works within the permissible boundaries laid out by the mobile device operating systems.

There are numerous challenges persist with modern day operating systems running on mobile devices. More than that, the hardware and the software video codecs that are readily available on mobile devices whose operating ranges of compression vary with nature of the operating system working conditions and how it controls these video codecs components for resources and the features that are built into these video codecs, and the like. Guaranteeing a video quality from transcoding using these video codecs either hardware or software on various mobile platforms employs an adoption of encoding strategy to the input video content by dynamically picking up the suitable set of encoding parameters which works better with certain operating systems on certain mobile platforms, and the like.

A Video Parsing Unit retrieves the original video that is stored in mobile systems persistent storage and performs the demultiplexing of video frames from the source content to an elementary standard stream format in the video codec format of the original video. This standard elementary stream is sent to the corresponding and suitable video codec decoder module available on the mobile device to generate uncompressed raw video frames in buffers which reside on the system's random access memory.

A Preprocessing Unit performs normalizes uncompressed video frames to make them suitable for analysis and for further reencoding or recompressing. This normalization process includes downscaling of uncompressed video frames, downsampling of uncompressed video frames, additionally aligning the frames temporally to employ machine learning models for analyzing the frames for other purposes, and the like.

A Video Analysis Unit analyzes uncompressed video frames in the buffers residing on the system's memory for recognizable video patterns and characteristics. Analyzer module look for degrees of motions between frames in the segments, focus levels of objects in the video frames, frame contrast sensitivity levels, sensor noises and the codec noises plus video coding artifacts introduced in the original compressed video.

An Encoding Plan Unit determines the final set of encoding parameters available or exposed by the device hardware encoders or software encoders including essential parameters like target resolution, frame rate, bitrate, and others for a portion or segment of the original video content. It estimates these variables for all the portions or segments in the original video content. Additionally, it performs normalization of these encoding parameters to have a way to encode the content in a more concise parameter settings to meet an expectable quality or range of video qualities set forth by the consumer mobile applications which use this video optimizer software development kit.

An Optimization module or unit is set to encode each portion or segment available in the original content with chosen parameters using the underlying device hardware or software encoders. Here the encoding of segments or portions of the stream can be performed sequentially or simultaneously depending on the device hardware encoders availability and how mobile operating systems provide controls to an application layer controlling the operations of the hardware encoders. Here the optimized segments or portions of the stream are stored into a device persistent storage system.

A reassemble unit performs concatenating all the optimized segments in the linear time scale to make it into a single video stream. Additionally, it combines the audio and other employed metadata with optimized streams to generate a final playable stream in compliance with the ISOBM format. Accordingly, the final optimized stream is advantageously playable on any mobile device, which has a player functionality implemented as per ISOBM playback controls.

Accordingly, the present invention includes transcoding method and systems for a mobile apparatus and systems in the standard video compression format. Mobile devices or systems and the software running on these provides a native method of video encoding technique but those standard methods don't work in an intelligent way of adopting codec control based on the source content complexity. There is a need by various parties and use cases where the content-adaptive transcoding on mobile devices elevates the user experience on video sharing and streaming. The proposed invention embodies components such as video parsing unit (VPU), Preprocessing unit (PPU), Video Analysis Unit (VAU), Encoding Budget Unit (EBU), Optimization Unit (OPU) and Reassemble Unit (RAU) to establish a content adaptive encoding schemes on mobile devices.

Accordingly, the system, method and computer program product for optimizing pre-encoded or pre-captured multimedia content on the mobile device can include a parsing stage which parses multimedia content in an appropriate and standard ways, a preprocessing stage for normalizing uncompressed content, an analysis stage to analyze video content in the uncompressed pixel domain to decide on the suitable set of parameters based on the source content characteristics, Encoding Budget scheme to compute a final set of encoding parameters based on transcode session configurations, an optimization stage where the content is recompressed with optimized encoding parameters, a reassemble stage to produce a final playable optimized content on any mobile devices, and the like.

Some stages of the functional flow like video parsing, video preprocessing and video analysis stages can be interleaved to process different segments or parts of the source content in a parallel fashion along with other functional modules, thus potentially reducing processing latency. This simultaneous processing of segments or portions of the source content pipelined between different stages is possible only if the operating system on the mobile system does allow it.

During the video analysis stage, it is programmable to analyze either certain portions of the source content or every segment that are part of the original source content. Analysis stage conceives a notion of analyzing a certain portion or segments of the source content only if the source content is pre-encoded or pre-captured by Mobile Camera Applications, and the like. Most of the Mobile Camera Applications uses Variable Bit-Rate (VBR) method to allocate more bits where the portion of the source content contains higher complexity in scenes compared to other parts where the content complexity is less or significantly less in which case it allocates moderate to less bits to those portions or segments of the video content. Video analysis module analyzes the characteristics of the raw uncompressed video frames, after which best-fit encoding parameters for encoders on the Mobile Device are chosen to realize the desired rate-distortion target. The preprocessing and video analysis stages, as further described herein, are part of the pre-process stage 102 as in FIG. 1, in which the encoder block 108 is the encoder component that is readily available on the Mobile devices to compress video stream into a desired rate-distortion range. In the video stream sharing communication flow, the decoder 110 and the post-process 104 modules are invoked on the receiving mobile devices to restore back the optimized content into the highest fidelity range possible.

The above system can function on a single hardware instance of Mobile Device, and the like. Additionally, during the course of transcoding by the method and system set forth in the invention, the other services that run on Mobile devices can simultaneously work on handling network requests such as notifications, network requests pertaining to other installed applications on the device executes in the background mode, and the like.

Another aspect of the described system and method includes delivering valid MPEG format stream in whichever codec format natively supported in the processing Mobile Device. Analysis stage works in a codec-agnostic manner in deciding the suitable set of encoding parameters based on the video codec format the output needs to be generated. Optimization stage invokes the suitable codec modules on the Mobile device to generate the output in the specified codec compatible stream format.

Figure 7:
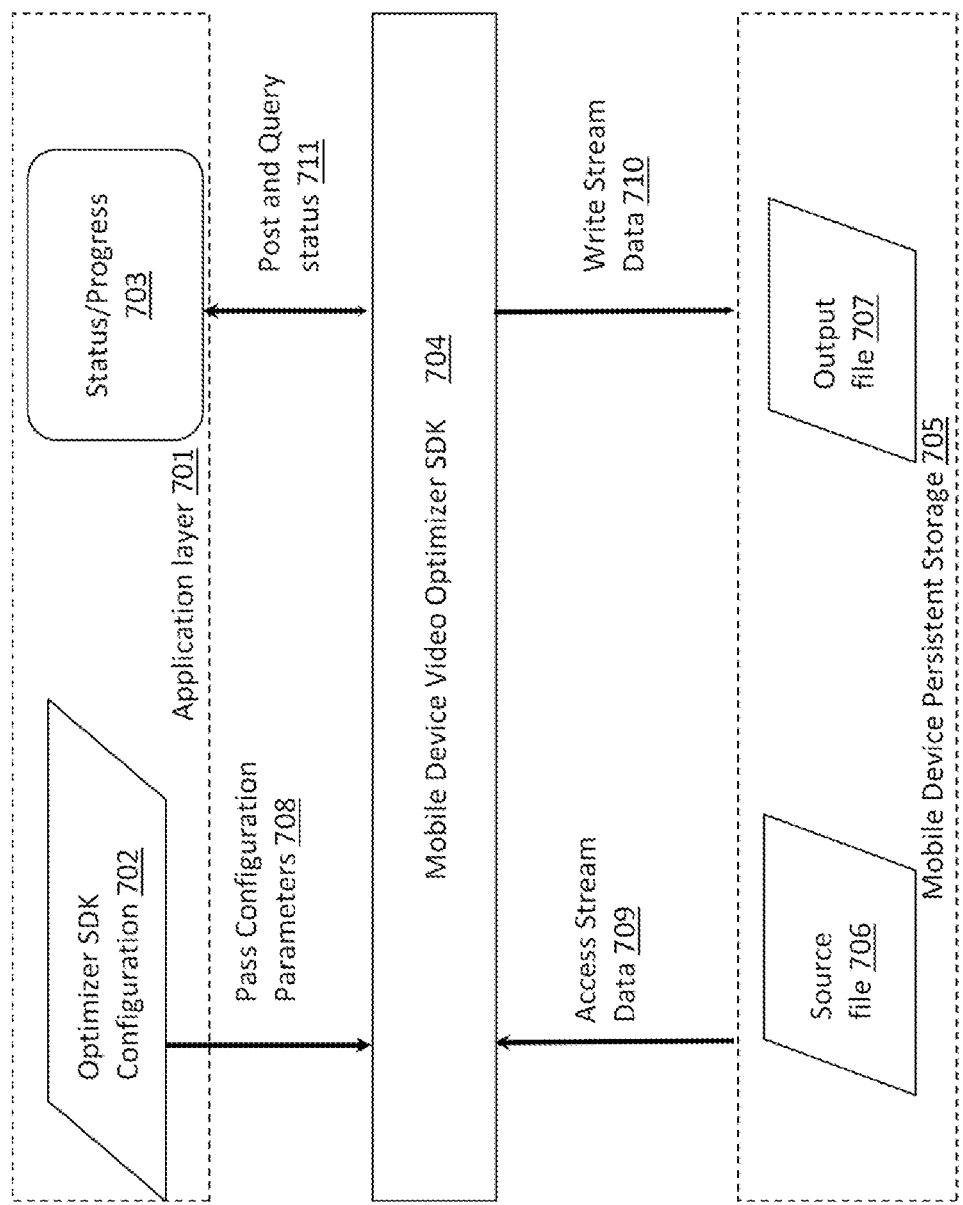
FIG. 7 is an illustrative system block diagram that includes a communication flow between mobile application layer to video optimizer software development kit (VO-SDK) and the dataflow happening between the mobile device system persistent storage to VO-SDK.

FIG. 7 is an illustrative block diagram of the video optimizer SDK works synchronously with an Application layer of the mobile device and the data communication flowing between video optimizer SDK to the system internals like OS, filesystem, and the like. In FIG. 7, the Mobile Application layer initiates a transcoding session and provides the configuration settings, source video file name including the full path of the video file that exists in the device persistent storage system to VO-SDK. VO-SDK communicates to the device persistent storage through the device operating system to retrieve source video stream file contents from the device storage to apply transcoding to it. As a result of transcoding by VO-SDK, the video streams payload reduces a lot maintaining the same perceptible video quality or the range of video quality set by the application layer in the transcode session. Additionally, the mobile application layer polls VO-SDK for transcode session status and progress of an ongoing transcode session in the VO-SDK.

Accordingly, the mobile application layer 701 sets up a transcode session which configures video optimizer SDK 704 by passing the target configuration of the SDK 702 to the video optimizer software development kit 704 through the data path 708 between Application layer 701 and video optimizer software development kit 704. Additionally, Application layer 701 can send a query regarding status or progress 703 of an ongoing transcode session through the data communication path 711 which goes between Application Layer 701 and the video optimizer software development kit 704. Video optimizer software development kit 704 interacts with mobile device file systems through operating systems by means of Access stream data flow 709 to retrieve a portion or segments of the source content 706 residing on the mobile device persistent storage system 705. Video optimizer software development kit 704 writes or outputs segments of the source content which are recompressed to an output file 707 which resides inside the mobile device persistent storage system 705, through a write stream data flow 710.

Figure 8:
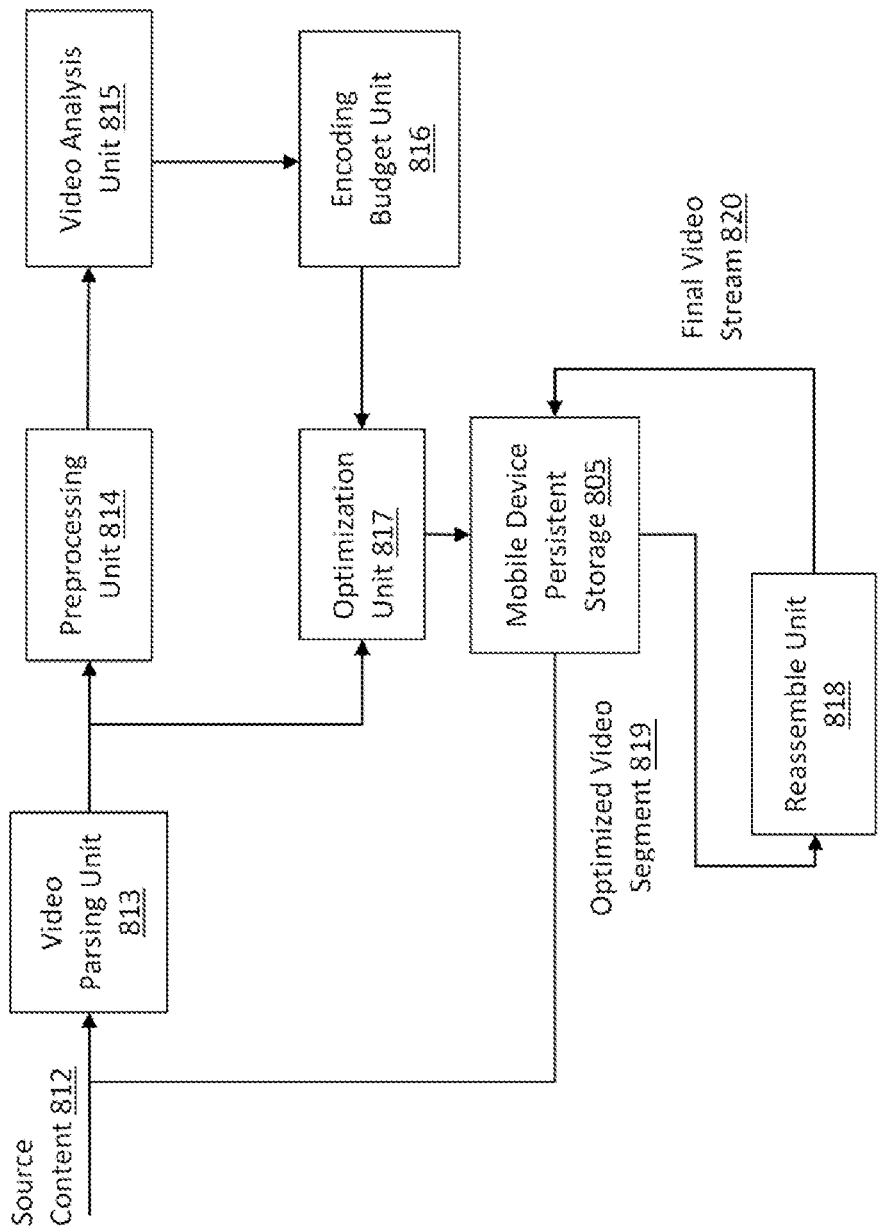
FIG. 8 illustrates main modules in the VO-SDK and the data communication between the internal modules and an interaction with other system components in the overall system.

FIG. 8 provides an overview of all the core functional modules built inside the video optimizer software development kit and an actual data flow exhibits between these core modules during a transcode session. In FIG. 8, the first stage of video optimizer sdk 704 is the video parsing unit 813 which receives the original source content 812 in the stream format it was captured and stored into the mobile device persistent storage 805. Video parsing unit 813 retrieves the video stream packets from the source content 812 and decodes them into an uncompressed pixel format to mobile device random access memory as buffers which are sent to the next stage in the pipeline which is Preprocessing Unit 814. Additionally, the Video parsing unit 813 forwards the uncompressed video frames in buffers to the Optimization Unit 817. Preprocessing Unit 814 normalizes the raw pixel frame buffers suitable into the format before sending them into a next processing stage—Video Analysis Unit 815. Video Analysis Unit 815 analyzes video content buffered in raw pixel uncompressed format for input signal characteristics like degree of motion, motion-blur, focus-blur, degree of complexity of objects in frames, and the like to estimate the suitable encoding parameters based on the content characteristics in an adaptive way. These main encoding parameters were sent to the next processing unit of Encoding Budget Unit 816 which computes the suitable set of parameters based on the original parameters the video optimizer software development kit 704 is configured for. The data flow switches to Optimization Unit 817 after Encoding Budget Unit 816 completes estimation of final encoding parameters is done. Optimization Unit 817 makes an application programming interface (API) call to the specified video codec encoder either hardware encoder or software encoder readily available on the mobile device to recompress the source content 812 into the employed output video codec elementary format and stores the recompressed segment data into the Mobile device persistent storage system 805.

After all the video segments in the source content 812 are processed through the above descriptive data flow by the video optimizer software development kit 704, the Reassemble Unit 818 retrieves all the reprocessed and optimized video content 819 from the mobile device persistent storage 705 and multiplex it with corresponding audio stream and other metadata informations of the source content 812 to generate a final media content in the ISOBM syntactical media format. ISOBM syntactical format stores all the frame timestamps and frame offset information into the proper "boxes" structures for the media stream to be playable on any ISOBM compliant playback devices or system. Additionally, Reassemble Unit 818 programmed to generate the recompressed stream in any other compatible media format the Mobile device is supporting, and the like.

Figure 9:
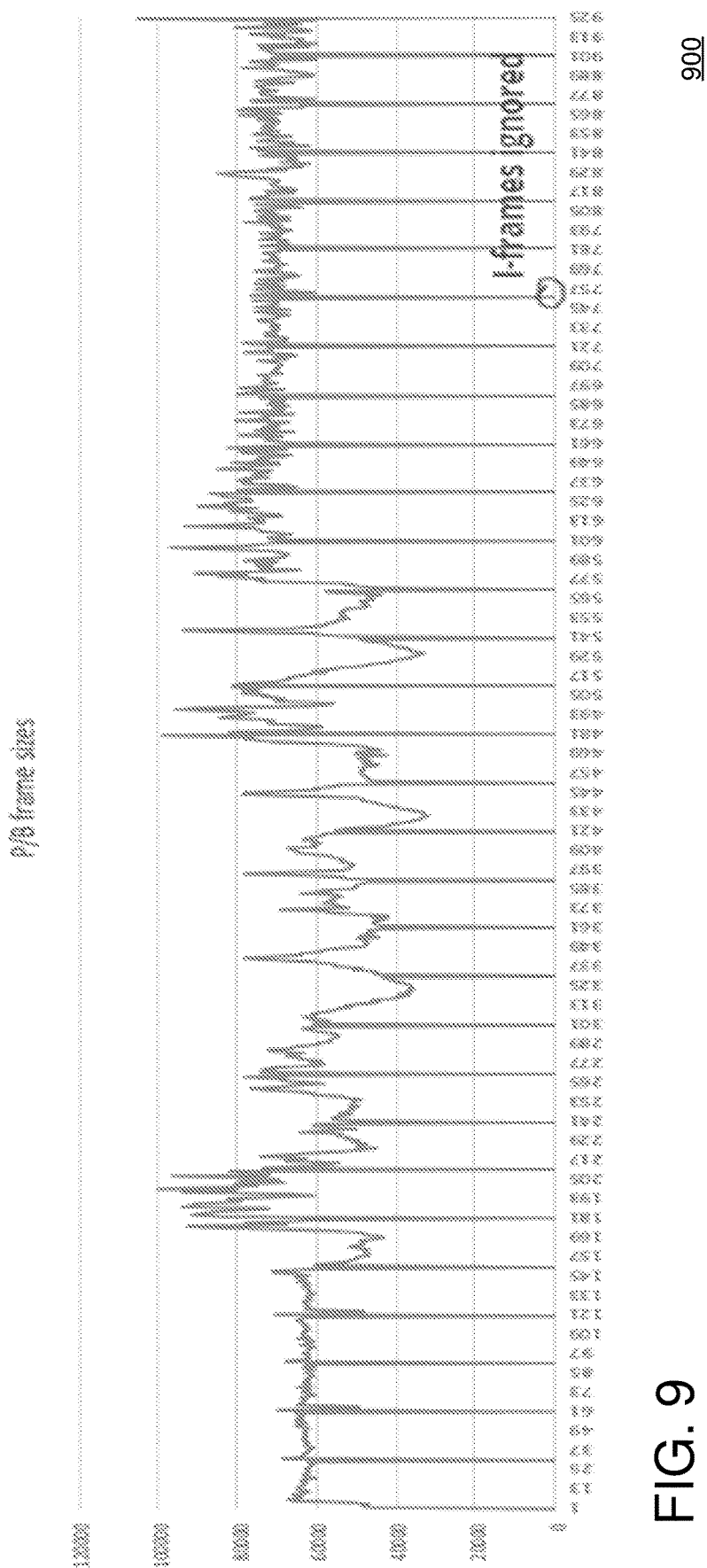
FIG. 9 illustrates actual frame payload sizes of all frames stored in the source content, wherein he payload sizes are illustrated for a sample stream where the source content is generated in any MPEG-video compressed frame format.

FIG. 9 is an example illustration of actual compressed frame payload sizes in the original source content 812. The x-axis represents the frame sequences including the frame indexes. The y-axis represents the frame sizes in the computer bytes unit. Here the frame sizes are represented for all frame types normally available in the MPEG-video compressed stream format. In one embodiment where only certain frame types of the compressed source content 812 are used to represent the nature of scenes or frame complexity in the source content 812. However, the Video Analysis Unit 815 in video optimizer software development kit 704 is configurable to select an appropriate content and/or frame types or combinations thereof for inferring the complexity of the scenes or frames embedded in the source content 812, and the like.

Figure 10:
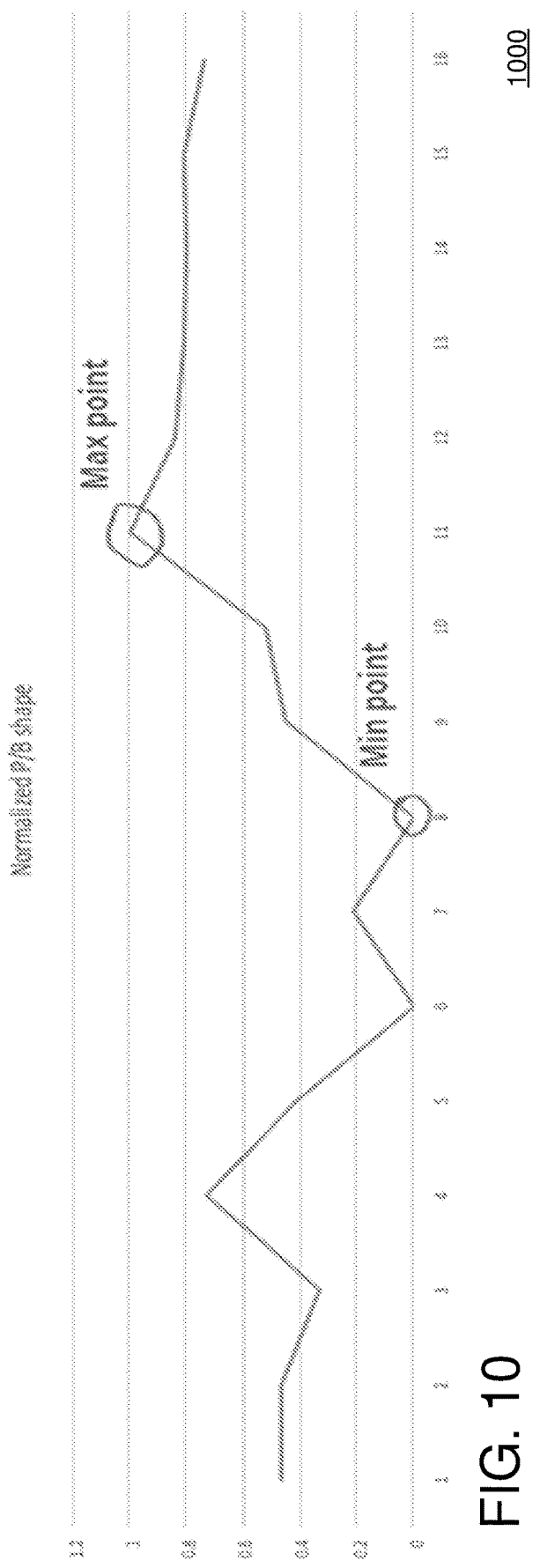
FIG. 10 illustrates a video analysis stage of a video optimizer software development kit programmed to analyze only selective portions or segments in the source content, wherein the video analysis unit reconstructs the stream complexity curve or shape from prior stream information.

FIG. 10 is an illustration of how the stream complexity shape or curve is reconstructed from stream prior encoded information in the source content 812. It also gives a pictorial representation of how only the selective portions or segments in the video content in source content 812 contribute to the representations of complexity derived from stream prior encoded information, and the like.

The below step-by-step guide describes the quick complexity inference method employed in the Video Analysis Unit 815 of the video optimizer software development kit 704, using existing stream information as prior. This method is used mainly when the Video Analysis Unit 815 of the video optimizer software development kit 804 is programmed to analyze only certain portions or segments in the source content 812 as a method of video analysis. This method uses MPEG video compression group of pictures (GOP) as a segment of video content.

1. Extract original stream shape
   a. Read whole bitstream, without decoding, keeping track of each P/B-packet size and timestamp
   b. Group sizes by target GOP duration (ex: 2 seconds). This is used as value "s" in the next formula. Basically "s" value for each GOP
   c. Normalize stream sizes. $S=(s-\min(s))/(\max(s)-\min(s))$
   d. Find min and max GOPs in normalized shape.
2. Analyze and infer final bitrates
   a. Analyze only min/max GOPs using available analysis methods
   b. Infer final bitrate for min/max GOP
   c. infer bitrates for other GOPs, based on stream shape and bitrates for best/worst GOPs, wherein gop_bitrate=S*(max_gop_bitrate—min_gop_bitrate)+min_gop_bitrate; and "S" is calculated from Step 1.c
3. Encode all GOPS in source content 112 with target bitrates.

Accordingly, a real-time post-processing system, method and computer readable medium are provided that transform MPEG on-demand media streams on mobile devices in a content-adaptive fashion. An application Layer is provided to control the video optimizer software development kit (SDK). A mobile device operating and file system interfaces with the video optimizer software development kit (SDK). The video optimizer software development kit processing stages, including a parsing stage that performs parsing and structuring of raw pixel video frame buffers. A preprocessing stage normalizes raw pixel frame buffers for further processing. A video analysis stage analyzes the source content in the uncompressed format for video patterns and characteristics to select the suitable set of encoding parameters in the specified video codec output format. A budget scheme stage estimates a suitable set of parameters for each of the portions or segments available in the source content. An optimization stage recompresses the source content with optimized parameters in a content-adaptive way and writes the optimized content into mobile device persistent storage. A reassembly unit retrieves the optimized segments from the mobile device's persistent storage and combines them with audio stream and other metadata stream information to generate the final playable media stream in the ISO base media file format or any other suitable media file format the application employs.

An applied selective content-adaptive transcoding method on the mobile device reduces the size of the video segments in the source content to improve delivery efficiency over a communications network, and including video analysis for analyzing portions or selective segments in the source content, and for analyzing the segments in the source content for a selection of right set of encoding parameters based on the video encoding capabilities, and operating ranges of the video encoders with either hardware and/or software available on the mobile device.

The video optimizer software development kit video parsing stage parses video streams from the source content to an uncompressed pixel format into a device random access memory, the preprocessing unit access such raw video buffers and normalizes them, suitability, for further processing.

The analysis stage analyzes the video raw buffers received from the preprocessing unit for video patterns and characteristics, such as degree of motions, motion-blur, focus-blur on the video objects in the frame buffers, and the like, to decide the suitable set of encoding parameters in a content-adaptive manner.

The encoding budget stage which receives all the set of parameters selected by the video analysis module to come up with a final set of encoding parameters in the target video codec format selected and applied by the application layer configuration settings. The Encoding Budget stage estimates the final parameters for all portions or segments in the source content.

The optimization stage accesses the suitable video encoder as either hardware or software available on the underlying mobile device in the specified video codec output format to recompress each portion or segments in the source content. The optimization stage writes the recompressed video segments into the mobile device persistent storage.

A reassemble unit retrieves each of the reprocessed video segments stored into mobile devices persistent storage system and combines them with audio stream and other employed metadata and substreams to generate a final playable stream in ISO base media file format or any other suitable media file format based on the mobile device capability.

A quick complexity inference method, based on stream prior encoded information and characteristics, is deployed in the video analysis stage of video optimizer software development kit, and includes the full system flow of application layer setting up and configuring the mobile device video optimizer software development kit for a transcode session on the mobile device. The video optimizer software development kit video parsing unit parses video streams in source content into uncompressed video frames residing on device random access memory which gets accessed by preprocessing stage to normalizes them for its suitability of processing by video analysis stage. The video analysis stage uses a relatively quick complexity inference method for selecting the suitable portions or segments in the source content for analysis by restructuring the complexity curve from the stream prior information in the source content. The video analysis stage picks up the suitable set of encoding parameters for only certain portions or segments in the source content and forwards them to the Encoding Budget stage. The Encoding Budget computes the final set of encoding parameters for all suitable portions or segments in the source content by using the encoding parameters the video analysis stage estimated for only certain segments in the source content by using the quick complexity inference method. The Encoding Budget estimates the final set of encoding parameters for each portion or segments available in the source content, based on the video codec format specified during the SDK configuration and other settings.

Thus, the disclosed system, method and computer program product for real-time post-processing system transforms MPEG-DASH on-demand media streams on mobile devices in a content-adaptive fashion, including a mobile application layer; video optimizer software development kit; mobile device operating system and persistent storage. The video optimizer software development is configured to accept the employed settings and configurations from the mobile application layer to perform an optimization on the source content in a content-adaptive way using suitable methods of analysis built into the system. The video optimizer software development kit interacts with mobile devices operating systems and persistent storage to perform the optimization in which the optimized video segments stored into the mobile device persistent storage.

The above described devices and subsystems of the illustrative embodiments can include, for example, any suitable servers, workstations, PCs, laptop computers, PDAs, Internet appliances, handheld devices, cellular telephones, wireless devices, computer architectures including x86, ARM, MIPS with operating system (OS) platforms including Windows, Linux, iOS, Android, other electronic devices, and the like, capable of performing the processes of the illustrative embodiments. The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, cable communications networks, satellite communications networks, G3 communications networks, Public Switched Telephone Network (PSTNs), Packet Data Networks (PDNs), the Internet, intranets, WiMAX Networks, "cloud" computer networks, virtual machine and hosting networks, a combination thereof, and the like.

It is to be understood that the devices and subsystems of the illustrative embodiments are for illustrative purposes, as many variations of the specific hardware and/or software used to implement the illustrative embodiments are possible, as will be appreciated by those skilled in the relevant art(s). For example, the functionality of one or more of the devices and subsystems of the illustrative embodiments can be implemented via one or more programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance of the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present invention. The databases can be organized using data structures (e.g., records, tables, arrays, fields, graphs, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof. All or a portion of the devices and subsystems of the illustrative embodiments can be conveniently implemented using one or more general purpose computer systems, microprocessors, digital signal processors, micro-controllers, application processors, domain specific processors, application specific signal processors, and the like, programmed according to the teachings of the illustrative embodiments of the present invention, as will be appreciated by those skilled in the computer and software arts. Appropriate software can be readily prepared by programmers of ordinary skill based on the teachings of the illustrative embodiments, as will be appreciated by those skilled in the software art. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present invention can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present invention for performing all or a portion (e.g., if processing is distributed) of the processing performed in implementing the illustrative embodiments. Computer code devices of the illustrative embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, SW frameworks including .NET/CLR, JVM, scripting frameworks including PHP, Python, Perl, Shell, and the like. Moreover, parts of the processing of the illustrative embodiments of the present invention can be distributed for better performance, reliability, cost, and the like.

As stated above, the devices and subsystems of the illustrative embodiments can include computer readable medium or memories for holding instructions programmed according to the teachings of the present invention and for holding data structures, tables, records, and/or other data described herein. Computer readable mediums can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, flash memories, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, transmission media including WiFi/802.11, BT, 3G, LTE, and the like. Common forms of computer-readable media can include, for example, a floppy disk, a flexible disk, hard disk, magnetic tape, any other suitable magnetic medium, a CD-ROM, CDRW, DVD, solid-state drive (SSD) storage devices, any other suitable optical medium, punch cards, paper tape, optical mark sheets, any other suitable physical medium with patterns of holes or other optically recognizable indicia, a RAM, a PROM, an EPROM, a FLASH-EPROM, a DRAM, a DDR, a NAND/NOR flash device, any other suitable memory chip or cartridge, a carrier wave, or any other suitable medium from which a computer can read.

While the present invention have been described in connection with a number of illustrative embodiments and implementations, the present invention is not so limited, but rather covers various modifications and equivalent arrangements, which fall within the purview of the appended claims.

What is claimed is:

1. A real-time post-processing system that transforms MPEG on-demand media streams on mobile devices in a content-adaptive fashion, the system comprising:
    a video optimizer software development kit (SDK);
    an application layer that controls the video optimizer SDK; and
    a mobile device operating and file system that interfaces with the video optimizer SDK,
    wherein the video optimizer SDK, includes:
    a video parsing stage that performs parsing and structuring of raw pixel frame buffers,
    a preprocessing stage that normalizes the raw pixel frame buffers for further processing,
    a video analysis stage that analyzes source content in an uncompressed format for video patterns and characteristics to select a set of encoding parameters in a specified video codec output format,
    a budget scheme stage that estimates a set of budget parameters for each of portions and/or segments available in the source content,
    an optimization stage that recompresses the source content with optimized encoding parameters in a content-adaptive manner to generate optimized content, and that writes the optimized content into persistent storage of the mobile device, and
    a reassembly stage retrieves segments from the optimized content on the persistent storage of the mobile device, and combines the segments with an audio stream and/or a metadata stream information to generate a playable media stream in an ISO base media file format and/or a media file application specific format,
    wherein the video analysis stage further includes a quick complexity inference method that estimates the set of encoding parameters by employing a complexity shape of a prior media stream.

2. The system of claim 1, further comprising:
    an applied selective content-adaptive transcoding method on the mobile device and that reduces a size of video segments in the source content to improve delivery efficiency over a communications network, and which includes video analysis method, including a method for analyzing portions and/or selective segments in the source content, a method for analyzing segments in the source content for selection of the set of encoding parameters based on video encoding capabilities and operating ranges of the video encoders as hardware and/or software available on the mobile device.

3. The system of claim 1, wherein the video parsing stage parses video streams from the source content to an uncompressed pixel format into a random access memory of the mobile device, the preprocessing stage accesses raw video buffers and normalizes the raw video buffers for further processing, the video analysis stage analyzes the raw video buffers received from the preprocessing unit for video patterns and characteristics, including degree of motions, motion-blur, and/or focus-blur on video objects in the raw pixel frame buffers to calculate the optimized encoding parameters in the content-adaptive manner, the encoding budget stage receives the optimized encoding parameters selected by the video analysis module to calculate a final set of encoding parameters in a target video codec format selected and applied by configuration settings of the application layer, and the encoding budget stage estimates the final parameters for the portions and/or segments in the source content.

4. The system of claim 3, wherein the optimization stage accesses a video encoder as hardware and/or software available on the underlying mobile device in a specified video codec output format to recompress each of the portions and/or segments in the source content, the optimization stage writes the recompressed video segments into the persistent storage of the mobile device, and the reassembly stage retrieves each of the reprocessed video segments stored in the persistent storage of the mobile device system and combines the reprocessed video segments with the audio stream and/or a metadata stream information to generate the playable media stream in the ISO base media file format and/or the media file application specific format.

5. The system of claim 1, further comprising:

the quick complexity inference method based on the stream prior encoded information and characteristics deployed in the video analysis stage of the video optimizer SDK, including setting up a full system flow in the application layer, and configuring the video optimizer SDK for a transcode session on the mobile device, wherein the video parsing stage parses video streams in the source content into uncompressed video frames on random access memory of the mobile device, and which are accessed by the preprocessing stage for normalizing for processing by the video analysis stage, the video analysis stage employs the quick complexity inference method for selecting the portions and/or segments in the source content for analysis by restructuring a complexity curve from stream prior information in the source content, the video analysis stage selects the set of encoding parameters for predetermined portions and/or segments in the source content and forwards to the selects the set of encoding parameters to an encoding budget stage, the encoding budget computes the final set of encoding parameters for the portions and/or segments in the source content by using the encoding parameters the video analysis stage estimated for the predetermined segments in the source content using the quick complexity inference method, and the encoding budget stage estimates the final set of encoding parameters for each of the portions and/or segments available in the source content based on the video codec format specified during configuration of the video optimizer SDK.

6. The system of claim 5, wherein the optimization stage accesses a video encoder as hardware and/or software available on the underlying mobile device in a specified video codec output format to recompress each of the portions and/or segments in the source content, the optimization stage writes the recompressed video segments into the persistent storage of the mobile device, and the reassembly stage retrieves each of the reprocessed video segments stored in the persistent storage of the mobile device system and combines the reprocessed video segments with the audio stream and/or a metadata stream information to generate the playable media stream in the ISO base media file format and/or the media file application specific format.

7. A real-time post-processing method for a system that transforms MPEG on-demand media streams on mobile devices in a content-adaptive fashion, including a video optimizer software development kit (SDK), an application layer that controls the video optimizer SDK, and a mobile device operating and file system that interfaces with the video optimizer SDK, the method comprising:

performing parsing and structuring of raw pixel frame buffers with a video parsing stage of a video optimizer software development kit (SDK);

normalizing the raw pixel frame buffers for further processing with a preprocessing stage of the video optimizer SDK;

analyzing source content in an uncompressed format for video patterns and characteristics to select a set of encoding parameters in a specified video codec output format with a video analysis stage of the video optimizer SDK;

estimating a set of budget parameters for each of portions and/or segments available in the source content with a budget scheme stage of the video optimizer SDK;

recompressing the source content with optimized encoding parameters in a content-adaptive manner to generate optimized content, and that writes the optimized content into persistent storage of the mobile device with an optimization stage of the video optimizer SDK; and retrieving segments from the optimized content on the persistent storage of the mobile device, and combining the segments with an audio stream and/or a metadata stream information to generate a playable media stream in an ISO base media file format and/or a media file application specific format with a reassembly stage of the video optimizer SDK, wherein the video analysis stage further includes a quick complexity inference method for estimating the set of encoding parameters by employing a complexity shape of a prior media stream.

8. The method of claim 7, further comprising:

reducing a size of video segments in the source content to improve delivery efficiency over a communications network with an applied selective content-adaptive transcoding method on the mobile device, including video analysis for analyzing portions and/or selective segments in the source content, and analyzing segments in the source content for selection of the set of encoding parameters based on video encoding capabilities and operating ranges of the video encoders as hardware and/or software available on the mobile device.

9. The method of claim 7, further comprising:

parsing with the video parsing stage video streams from the source content to an uncompressed pixel format into a random access memory of the mobile device;

accessing with the preprocessing stage raw video buffers and normalizing the raw video buffers for further processing;

analyzing with the video analysis stage the raw video buffers received from the preprocessing unit for video patterns and characteristics, including degree of motions, motion-blur, and/or focus-blur on video objects in the raw pixel frame buffers to calculate the optimized encoding parameters in the content-adaptive manner;

receiving with the encoding budget stage the optimized encoding parameters selected by the video analysis module and calculating a final set of encoding parameters in a target video codec format selected and applied by configuration settings of the application layer; and estimating with the encoding budget stage the final parameters for the portions and/or segments in the source content.

10. The method of claim 9, further comprising:

accessing with the optimization stage a video encoder as hardware and/or software available on the underlying mobile device in a specified video codec output format and recompressing each of the portions and/or segments in the source content;

writing with the optimization stage the recompressed video segments into the persistent storage of the mobile device; and retrieving with the reassembly stage each of the reprocessed video segments stored in the persistent storage of the mobile device system, combining the reprocessed video segments with the audio stream and/or a metadata stream information, and generating the playable media stream in the ISO base media file format and/or the media file application specific format.

11. The method of claim 7, further comprising:

deploying the quick complexity inference method based on the stream prior encoded information and characteristics with the video analysis stage of the video optimizer SDK, including setting up a full system flow in the application layer, and configuring the video optimizer SDK for a transcode session on the mobile device;

parsing with the video parsing stage video streams in the source content into uncompressed video frames on random access memory of the mobile device, and which are accessed by the preprocessing stage for normalizing for processing by the video analysis stage, employing with the video analysis stage the quick complexity inference method for selecting the portions and/or segments in the source content for analysis by restructuring a complexity curve from stream prior information in the source content;

selecting with the video analysis stage the set of encoding parameters for predetermined portions and/or segments in the source content and forwarding to the selects the set of encoding parameters to an encoding budget stage;

computing with the encoding budget the final set of encoding parameters for the portions and/or segments in the source content by using the encoding parameters the video analysis stage estimated for the predetermined segments in the source content using the quick complexity inference method; and estimating with the encoding budget stage the final set of encoding parameters for each of the portions and/or segments available in the source content based on the video codec format specified during configuration of the video optimizer SDK.

12. The method of claim 11, further comprising:

accessing with the optimization stage a video encoder as hardware and/or software available on the underlying mobile device in a specified video codec output format to recompress each of the portions and/or segments in the source content;

writing with the optimization stage the recompressed video segments into the persistent storage of the mobile device; and retrieving with the reassembly stage each of the reprocessed video segments stored in the persistent storage of the mobile device system, combining the reprocessed video segments with the audio stream and/or a metadata stream information, and generating the playable media stream in the ISO base media file format and/or the media file application specific format.

13. A non-transitory computer-readable medium for a real-time post-processing method for a system that transforms MPEG on-demand media streams on mobile devices in a content-adaptive fashion, including a video optimizer software development kit (SDK), an application layer that controls the video optimizer SDK, and a mobile device operating and file system that interfaces with the video optimizer SDK, and with instructions stored thereon, that when executed by a processor, perform the steps comprising:

performing parsing and structuring of raw pixel frame buffers with a video parsing stage of a video optimizer software development kit (SDK);

normalizing the raw pixel frame buffers for further processing with a preprocessing stage of the video optimizer SDK;

analyzing source content in an uncompressed format for video patterns and characteristics to select a set of encoding parameters in a specified video codec output format with a video analysis stage of the video optimizer SDK;

estimating a set of budget parameters for each of portions and/or segments available in the source content with a budget scheme stage of the video optimizer SDK;

recompressing the source content with optimized encoding parameters in a content-adaptive manner to generate optimized content, and that writes the optimized content into persistent storage of the mobile device with an optimization stage of the video optimizer SDK; and retrieving segments from the optimized content on the persistent storage of the mobile device, and combining the segments with an audio stream and/or a metadata stream information to generate a playable media stream in an ISO base media file format and/or a media file application specific format with a reassembly stage of the video optimizer SDK, wherein the video analysis stage further includes a quick complexity inference method for estimating the set of encoding parameters by employing a complexity shape of a prior media stream.

14. The computer-readable medium of claim 13, further comprising:
reducing a size of video segments in the source content to improve delivery efficiency over a communications network with an applied selective content-adaptive transcoding method on the mobile device, including video analysis for analyzing portions and/or selective segments in the source content, and analyzing segments in the source content for selection of the set of encoding parameters based on video encoding capabilities and operating ranges of the video encoders as hardware and/or software available on the mobile device.

15. The computer-readable medium of claim 13, further comprising:
parsing with the video parsing stage video streams from the source content to an uncompressed pixel format into a random access memory of the mobile device;
accessing with the preprocessing stage raw video buffers and normalizing the raw video buffers for further processing;
analyzing with the video analysis stage the raw video buffers received from the preprocessing unit for video patterns and characteristics, including degree of motions, motion-blur, and/or focus-blur on video objects in the raw pixel frame buffers to calculate the optimized encoding parameters in the content-adaptive manner;
receiving with the encoding budget stage the optimized encoding parameters selected by the video analysis module and calculating a final set of encoding parameters in a target video codec format selected and applied by configuration settings of the application layer; and
estimating with the encoding budget stage the final parameters for the portions and/or segments in the source content.

16. The computer-readable medium of claim 15, further comprising:
accessing with the optimization stage a video encoder as hardware and/or software available on the underlying mobile device in a specified video codec output format and recompressing each of the portions and/or segments in the source content;
writing with the optimization stage the recompressed video segments into the persistent storage of the mobile device; and
retrieving with the reassembly stage each of the reprocessed video segments stored in the persistent storage of the mobile device system, combining the reprocessed video segments with the audio stream and/or a metadata stream information, and generating the playable media stream in the ISO base media file format and/or the media file application specific format.

17. The computer-readable medium of claim 13, further comprising:
deploying the quick complexity inference method based on the stream prior encoded information and characteristics with the video analysis stage of the video optimizer SDK, including setting up a full system flow in the application layer, and configuring the video optimizer SDK for a transcode session on the mobile device;
parsing with the video parsing stage video streams in the source content into uncompressed video frames on random access memory of the mobile device, and which are accessed by the preprocessing stage for normalizing for processing by the video analysis stage,
employing with the video analysis stage the quick complexity inference method for selecting the portions and/or segments in the source content for analysis by restructuring a complexity curve from stream prior information in the source content;
selecting with the video analysis stage the set of encoding parameters for predetermined portions and/or segments in the source content and forwarding to the selects the set of encoding parameters to an encoding budget stage;
computing with the encoding budget the final set of encoding parameters for the portions and/or segments in the source content by using the encoding parameters the video analysis stage estimated for the predetermined segments in the source content using the quick complexity inference method; and
estimating with the encoding budget stage the final set of encoding parameters for each of the portions and/or segments available in the source content based on the video codec format specified during configuration of the video optimizer SDK.

18. The computer-readable medium of claim 17, further comprising:
accessing with the optimization stage a video encoder as hardware and/or software available on the underlying mobile device in a specified video codec output format to recompress each of the portions and/or segments in the source content;
writing with the optimization stage the recompressed video segments into the persistent storage of the mobile device; and
retrieving with the reassembly stage each of the reprocessed video segments stored in the persistent storage of the mobile device system, combining the reprocessed video segments with the audio stream and/or a metadata stream information, and generating the playable media stream in the ISO base media file format and/or the media file application specific format.

* * * * *